July 10, 1928.
L. W. BROWNE
LIQUID CONTROLLING DEVICE
Filed Dec. 8, 1924
1,677,096
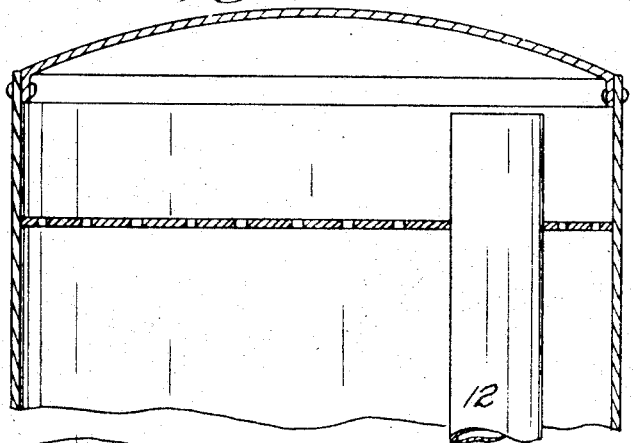
Fig.1.
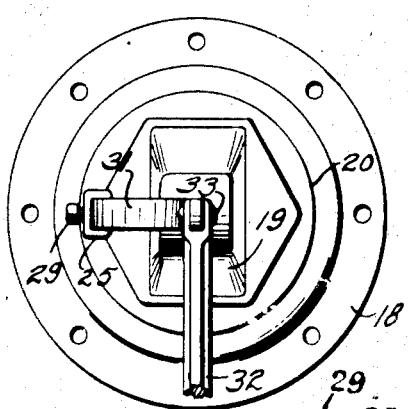
Fig.2.
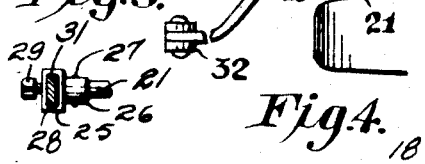
Fig.3.
Fig.4.
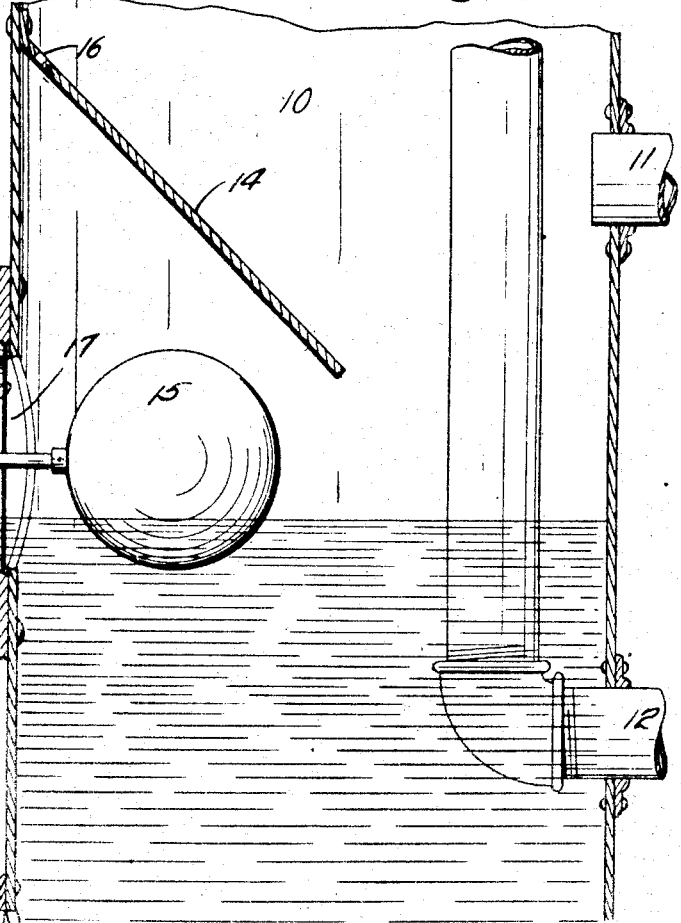
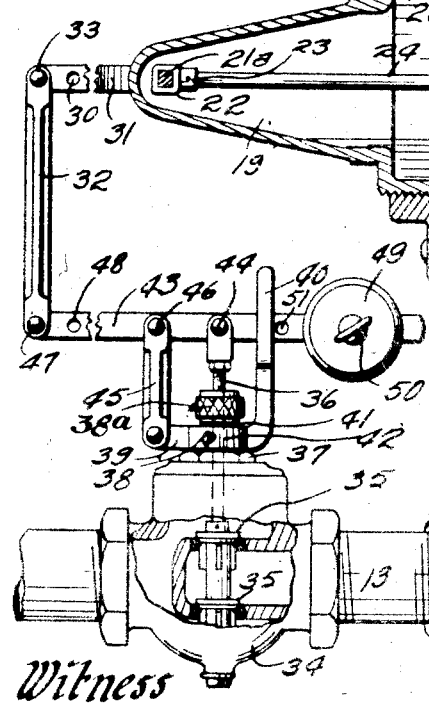
Witness
Inventor
Lyle W. Browne
by Bair & Freeman Attorneys Patented July 10, 1928.

1,677,096

UNITED STATES PATENT OFFICE.

LYLE W. BROWNE, OF MARSHALLTOWN, IOWA, ASSIGNOR TO THE FISHER GOVERNOR COMPANY, OF MARSHALLTOWN, IOWA.

LIQUID-CONTROLLING DEVICE.

Application filed December 8, 1924. Serial No. 754,650.

My invention relates to liquid controlling devices, and the object of my invention is to provide such a device of simple and inexpensive construction, readily adapted to be mounted on tanks of various kinds and sizes.

A further object is to provide such a device adapted to be built as a unit in a factory and capable of easy adjustment for assembling on different tanks under different conditions.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 shows a vertical, sectional view of a tank and a liquid level controlling device embodying my invention.

Figure 2 shows a front elevation of part of the device.

Figure 3 is a detail view of part of the device, to-wit, the fitting for the float lever; and Figure 4 is a detail plan view of part of the operative mechanism.

My present device is intended to provide a liquid level controlling device adapted for use on small tanks, water heaters, condensation tanks, oil tanks and the like, embodying in a unit a float and a mounting therefor easy to assemble on the tank, and a float operated valve structure which can be easily installed in a pipe line.

In the accompanying drawings, I have used the reference numeral 10 to indicate generally a tank in connection with which my liquid level control device is installed.

I have shown for purposes of illustration a tank of the separator type, used for receiving oil and gas from wells, having the inlet opening 11, a gas discharge pipe 12, and an oil discharge pipe line 13.

The tank has an inclined shield 14 to protect the float 15 from the inlet flow from the well or other source. The shield has holes 16 near its upper part to permit the escape of gas to the top of the tank 10.

It is obvious that it is desirous, where both oil and gas are taken from a well, to separate them as rapidly as they may be supplied to the tank 10, so that the gas may be discharged to the air or to other containers, and the oil may be permitted to pass into reservoirs or pipe lines.

It is, of course, well known that the total supply in a given time varies in the case of different wells, as well as at different periods.

It is also known that the relative amounts of oil and gas vary in different wells and at different times.

It is therefore desirable that the level of oil in the tank 10 be maintained at a predetermined height. If the oil gets too high, it flows off through the gas line 12. If the oil level becomes too low, gas would pass into the oil pipe line which must be prevented.

I use a float 15 for controlling the level of liquid in the tank. The float 15 is arranged below and protected by the shield 14. A suitable hole 17 is cut in the side wall of the tank.

Mounted on the outside of the tank around the hole 17 is an annular, interiorly screw-threaded ring 18.

I provide a supporting member 19, having the form of a hollow cone closed at its small end and open at its large end. The large end is exteriorly screw-threaded as at 20 to coact with the ring 16.

Rotatably mounted in the outer end of the support 19 is a shaft 21, which projects through one side of the wall of the support 19. Part of the shaft 21 may be square in cross section as at 21ª and is received in a fitting 22 having a socket 23. Received in the socket 23 is one end of the float arm 24, on which is mounted the float 15.

A fitting 25 has a socket 26 receiving the outer end of the shaft 21 and adjustably fixed thereon by a set screw 27.

A float lever 31 is extended through the hole 28 in the fitting 25 and is secured in position by a set screw 29. The lever 31 has a series of holes 30. A link 32 of suitable length is pivoted to the lever 31 by a pin or the like 33 selectively received in one of the holes 30.

My device includes a valve adapted to be arranged in the pipe line 13 for controlling flow therethrough.

The valve indicated generally at 34, has a pair of valves proper 35 on a common stem 36, extending through the valve cover plate 37.

Adjustably mounted on the cover plate 37 is a collar 42 having an arm 39 and opposite guide arms 40. The collar is mounted on a cylindrical extension 41 on the cover plate 37 and is locked in place as against rotation by a set screw 38 and as against movement away from the body of the plate 37 by a lock nut 38ª.

By loosening the set screw, the collar may be rotated for changing its position for securing desired adjustment.

A valve lever 43 is pivoted to the stem 36 by a removable pin 44 or the like and extends between the guide arms 40.

A link 45 is pivoted to the arm 39 and is detachably pivoted to the lever 43 by means of a removable pin 46 or the like.

The link 32 is adjustably pivoted to the valve lever 43 by means of a pin 47 selectively extended through one of a series of holes 48 in the lever. On the lever 43, a balancing weight 49 is adjustably fixed by means of a set screw 50.

The pins 46 and 44 may be removed, the set screw 38 loosened and the collar 42 may be turned a half revolution on the extension 41 and thereupon the pin 46 may be extended through the hole 51 shown in Figure 1. By thus reversing the position of the collar and connecting the lever 43 in the different manners mentioned, the lifting movement of the lever may be used to either open or close the valves 35 as may be desired.

I have thus provided a liquid level controlling device, which can be readily mounted on tanks of various kinds and readily adjusted for a variety of assemblings.

It will be noted that in the practical use of my device, the upward and downward movement of the float 15 will actuate the shaft 21, the lever 31, and the lever 43 through the parts connecting said levers for thus controlling the valves 35.

It will be noted that a device of this kind can be readily and easily mounted on various kinds of tanks and that the assembling of the device on the tank involves only the simple operations of cutting of the hole 17, securing the ring 18 to the tank wall, assembling the float and valve structure in position.

Links 32 of different lengths may be used for different installations.

Adjustments for different tanks and conditions are easily made. The arm 31 may be adjusted on the shaft 21. The link 32 may be varied in length and is easily adjusted on the levers 31 and 43. By changing the position of the collar 42 and its connection with the lever 43, the operation of the valves 35 may be reversed.

It will thus be seen that the float can without difficulty be mounted at different heights on the tank and in many different positions with reference to the pipe 13.

It will be understood that I intend to cover by my claims such adjustments and modifications in structure as may be reasonably included within their scope.

My device is of very simple and inexpensive construction, is readily and easily assembled or taken apart and is readily adjustable for assembling to suit a variety of working conditions, yet it can be built at the factory, and stored or shipped as a complete unitary structure.

I claim as my invention:

1. In combination with a tank having an opening therein, a device of the class described, comprising a flange secured to said tank and surrounding said opening, a tapered hollow support closed at its small and open at its larger end, said larger end being screw threadedly mounted in said flange, a shaft mounted in the wall of said support at its small end, a float, a float arm connecting the shaft with the float, a lever mounted on said shaft for longitudinal adjustment, a link pivoted to said lever, a valve structure having a casing and a stem projecting therefrom, a collar mounted externally on said casing by means of a set screw for rotary adjustment having an arm and opposite guide arms, a second lever detachably pivoted to said stem, a link pivoted to said collar arm and detachably pivoted to said second lever and a link detachably pivoted to said two levers.

2. In a device of the class described, a tapered support closed at its smaller and open at its larger end, said larger end being screw threadedly mounted on the wall of a tank having an opening therein through which a float may extend into the tank, a rock shaft mounted in the wall of the support near its outer end, a float arm, said float being connected with the float arm, a valve structure having a projecting stem, and means of connection between said shaft and said stem.

LYLE W. BROWNE.